United States Patent [19]
Welsh

[11] Patent Number: 5,515,726
[45] Date of Patent: May 14, 1996

[54] VEHICLE WHEEL COVER NOISE TESTING MACHINE

[75] Inventor: Timothy R. Welsh, Waterford, Mich.

[73] Assignee: Chrysler Corporation, Auburn Hills, Mich.

[21] Appl. No.: 364,895

[22] Filed: Dec. 27, 1994

[51] Int. Cl.$^6$ .................................................. G01M 17/02
[52] U.S. Cl. .................. 73/571; 73/572; 73/146; 73/865.3
[58] Field of Search ................... 731/571, 572, 731/587, 596, 146, 865.3

[56] References Cited

U.S. PATENT DOCUMENTS

| | | | |
|---|---|---|---|
| 3,375,714 | 4/1968 | Bottasso | 73/146 |
| 3,589,182 | 6/1971 | Burgett | 73/146 |
| 3,726,124 | 4/1973 | Obarski | 73/8 |
| 3,807,226 | 4/1974 | Williams | 73/146 |
| 3,948,095 | 4/1976 | Burgett et al. | 73/146 |
| 4,233,838 | 11/1980 | Stiebel | 73/146 |
| 5,014,551 | 5/1991 | Beebe et al. | 73/146 |
| 5,111,687 | 5/1992 | Hill | 73/146 |
| 5,165,273 | 11/1992 | Church | 73/146 |
| 5,460,036 | 10/1995 | Church | 73/146 |

*Primary Examiner*—Hezron E. Williams
*Assistant Examiner*—Rose M. Finley
*Attorney, Agent, or Firm*—Edward A. Craig

[57] ABSTRACT

A vehicle wheel cover noise testing machine comprises a test wheel mounted for rotation in the compartment of a first housing. A wheel cover is attached to the test wheel. A drive wheel is mounted in the compartment of a second housing. The housings are supported adjacent to one another in a cage and have adjacent walls provided with registering openings. The drive wheel is in frictional peripheral contact with a tire on the test wheel through the openings so that the test wheel may be rotated by the drive wheel. A microphone in the compartment for the test wheel detects wheel cover noise.

14 Claims, 3 Drawing Sheets

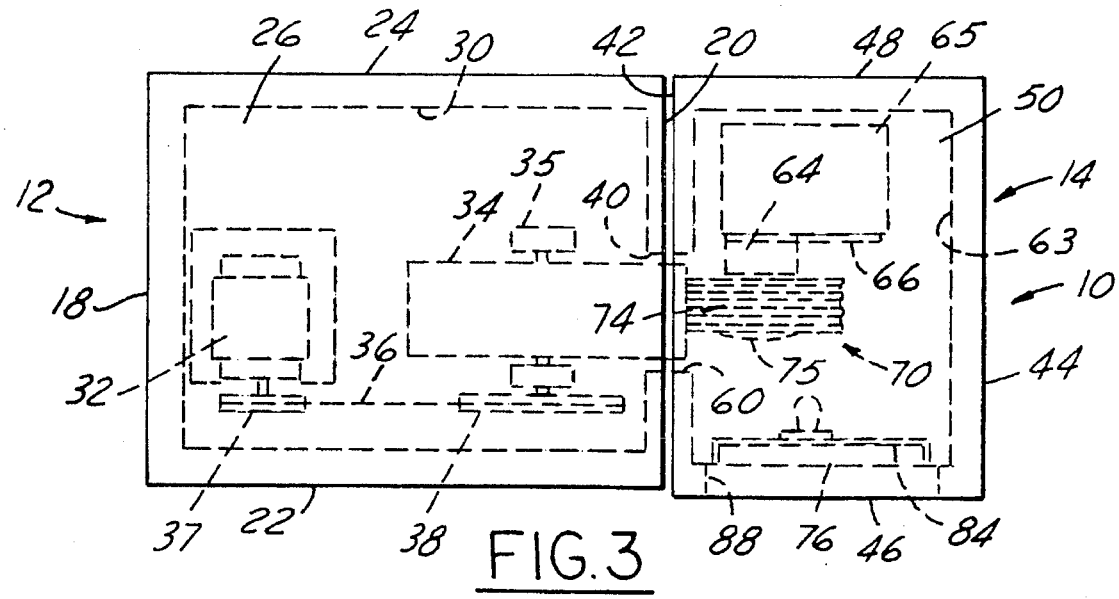
FIG. 3
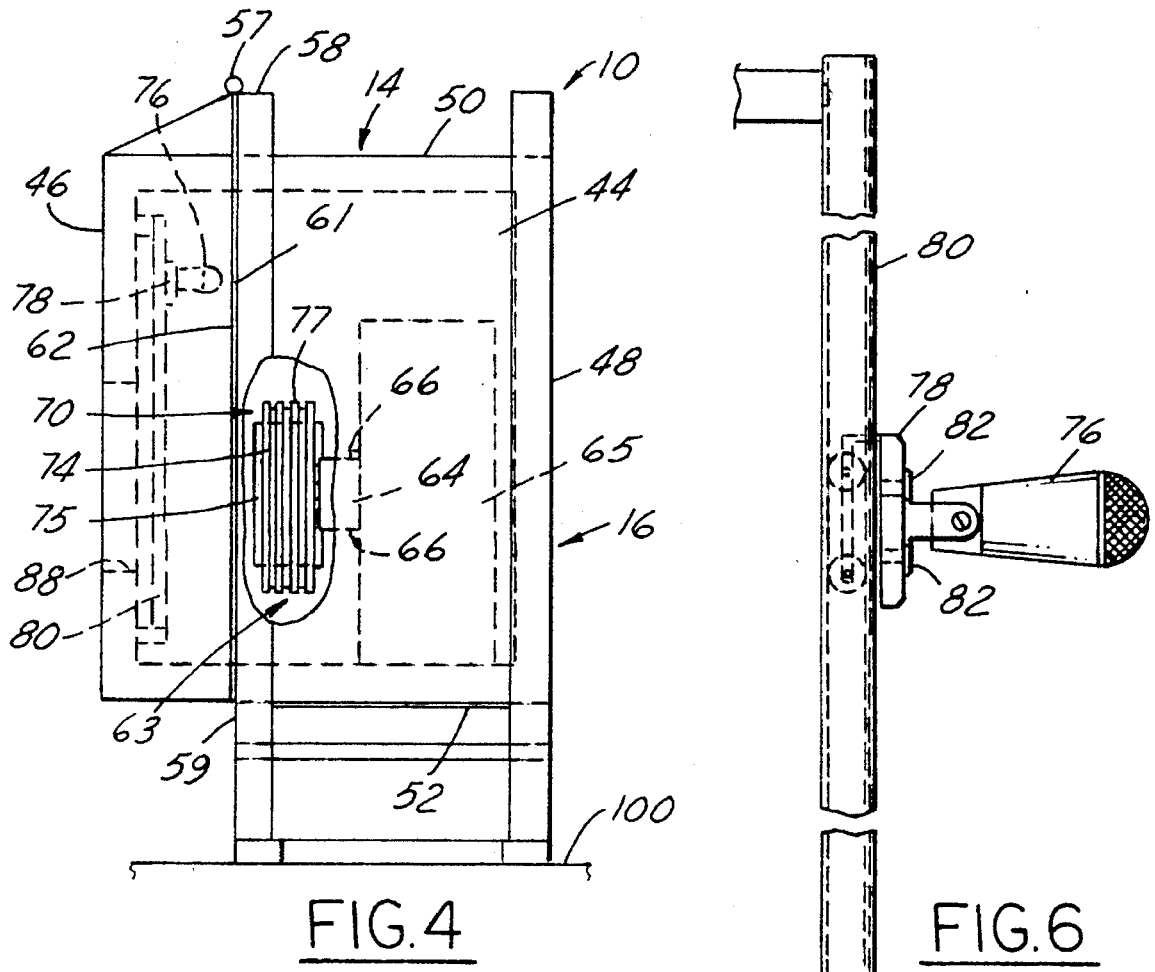
FIG. 4
FIG. 6

5,515,726

VEHICLE WHEEL COVER NOISE TESTING MACHINE

FIELD OF INVENTION

This invention relates generally to a machine for testing automotive vehicle wheel covers for noise.

BACKGROUND AND SUMMARY OF THE INVENTION

Noisy wheel covers are very objectionable to car owners. In order to test wheel covers for noise, the wheel covers must be tested when mounted on a wheel and the wheel is rotating. Wheel covers have been tested in the past but with results that have not been entirely satisfactory. It is important that the testing take place in an environment which is protected from extraneous or random outside noise. It is also desirable that the testing machine be capable of testing wheel covers on wheels of varying sizes and with equipment for detecting and transmitting any noise produced during testing to persons located some distance from the test machine.

In accordance with the present invention, the test wheel is mounted in a compartment and preferably is driven in rotation by a drive wheel mounted outside the compartment but in frictional peripheral contact with a tire on the test wheel through an opening in the compartment. A microphone is supported in the compartment of the test wheel for detecting and transmitting wheel cover noise incident to rotation of the test wheel. Preferably, a support is provided for the microphone comprising a first track extending in one direction and a second track perpendicular to the first track and movable along the first track. The microphone is mounted for movement along the second track so that placement of the microphone in a desired position along the second track and the second track in a desired position along the first track will enable the microphone to be accurately positioned where desired to best monitor noise when the wheel and wheel cover are rotated.

Preferably, the drive wheel is mounted in a separate compartment so that the noise, if any, incidental to operation of the drive wheel will not affect the test results.

It is also preferable that both compartments be mounted within a cage supported on isolator pads so that any vibration occasioned by the operation of the test apparatus will be dampened.

Preferably, the compartment for the test wheel has a door which can be opened to load and unload a test wheel, and a window for viewing which can be opened to adjust the microphone.

One object of this invention is to provide a wheel cover noise testing machine having the foregoing features.

Another object is to provide a wheel cover testing machine which is composed of a relatively few simple parts, is rugged and durable in use, and can be relatively inexpensively manufactured and assembled.

These and other objects, features and advantages of the invention will become more apparent as the following description proceeds, especially when considered with the accompanying drawings.

BRIEF DESCRIPTION OF THE DRAWINGS

FIG. 3 is a top view of the machine shown in FIG. 1, but omitting the supporting cage.

FIG. 4 is a side view thereof.

FIG. 6 is a side elevational view of the structure in FIG. 5.

DETAILED DESCRIPTION OF THE PREFERRED EMBODIMENT

Figure 1:
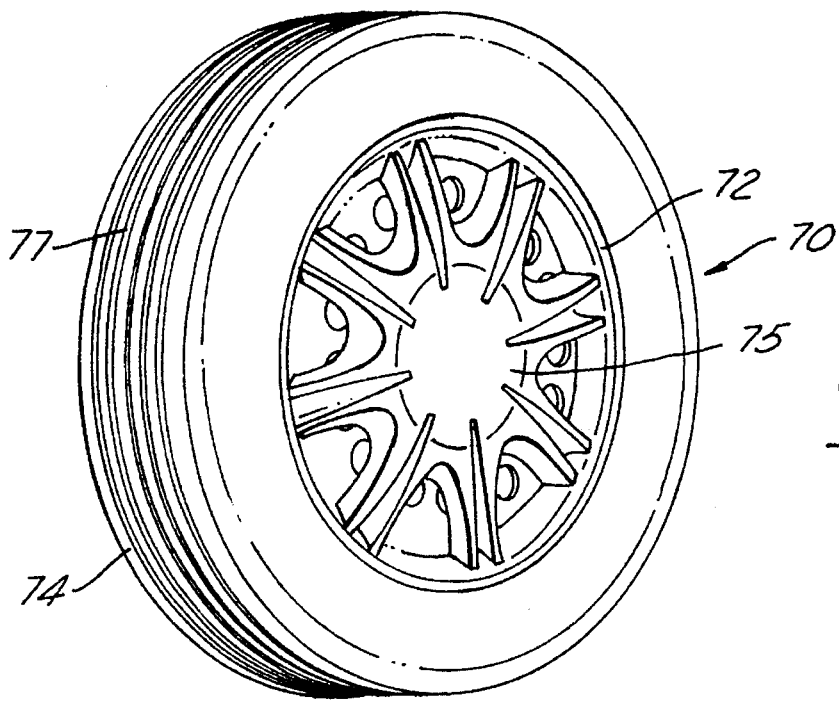
FIG. 1 is a perspective view of a test wheel having a tire and a wheel cover mounted thereon, of the type adapted to be tested for wheel cover noise by a machine constructed in accordance with this invention.

Referring now more particularly to the drawings, the noise testing machine 10 comprises two housings 12 and 14 placed side by side and supported in a safety cage 16.

The housing 12 is preferably of rectangular configuration having spaced apart, parallel side walls 18 and 20, spaced apart, parallel front and rear walls 22 and 24, and spaced apart, parallel top and bottom walls 26 and 28 all connected together to define an interior chamber or compartment 30.

Mounted on the bottom wall 28 within the compartment 30 is a motor 32. A drive wheel 34, preferably made of steel, has a smooth periphery and is mounted on the bottom wall by a stand 35 for rotation about its horizontal central axis. The drive wheel is driven in rotation by a chain or belt 36 extending over sprockets or sheaves 37 and 38, respectively, on the output shaft of the motor 32 and the drive wheel 34. The side wall 20 has an opening 40 and the periphery of drive wheel 34 projects through the opening. A control panel 39 and disconnect switch 41 for motor 34 are provided on the outer side of the front wall 22 of housing 12.

The housing 14 is preferably of rectangular configuration having spaced apart, parallel side walls 42 and 44, spaced apart, parallel front and rear walls 46 and 48, and spaced part top and bottom walls 50 and 52.

The housing 14 is in two separate parts, a rear part 54 and a front part 56. The rear part 54 is stationary and is open at the front and comprises the rear wall 48 and the rear portions of the side, top and bottom walls 42, 44, 50 and 52. The front part 56 is a hinged door which is open at the rear and comprises the front wall 46 and the front portions of the side, top and bottom walls 42, 44, 50 and 52. The front part or door 56 is hinged at the top on a horizontal hinge 57 carried by the top frame member 58 of the front frame 59 of cage 16. When the door 56 is in the closed vertical position, the rear edges 61 of the front portions of the side, top and bottom walls 42, 44, 50 and 52 abut in a flush relationship with the front edges 62 of the rear portions of the side, top and bottom walls 42, 44, 50 and 52 in a vertical closed or sealed relationship. Sealing strips may be provided along these abutting front and rear edges to seal out noise. In this condition, a chamber or compartment 63 is defined within the walls of the housing 14.

The door 56 can be swung up to substantially a horizontal position for loading and unloading purposes as described more fully hereinafter. The side wall 42 of the housing 14, specifically that portion thereof in the stationary or rear part 54, has an opening 60 registering with opening 40 in the side wall 20 of housing 12 to clear the drive wheel 34. Openings 40 and 60 are only just large enough to clear the drive wheel.

Mounted on the bottom wall in the compartment 63 of housing 14 is a tire load and support frame 65 which carries a universal hub assembly 64. The hub assembly can move horizontally on horizontal tracks 66 of the support frame 62 and can be locked in adjusted position by a clamp (not shown). A test wheel 70, of the type shown in FIG. 1, has a rim 72 and is mounted for axial rotation on the hub assembly 64. The central axis of wheel 70 is parallel to the central axis of wheel 34. A tire 74 is shown concentrically mounted on the rim. A wheel cover 75 to be tested is shown attached by any suitable means to the body of the wheel 70. The tire 74 is preferably an ordinary automotive tire of rubber or rubber-like material, but is specially constructed with laterally spaced apart, continuous circumferential tread grooves 77 in its periphery to eliminate tread noise. The usual tread grooves in most vehicle tires sometimes tend to produce a noise which would interfere with the test results. The grooved periphery of the tire 74 is in pressure frictional contact with the periphery of the drive wheel 34 during testing and there is practically no noise associated with this frictional contact.

A microphone 76 is provided in the compartment 63 to detect and transmit to a location removed from the machine any noises generated in the compartment by the wheel cover during the test. The microphone is mounted on a carrier 78 which in turn is mounted on a vertical track 80 for movement up and down along the track. The carrier 78 can be locked in position with respect to the track 80 by a lock screws 82.

The ends of the vertical track 80 engage the top and bottom horizontal rails 84 of a second track for movement along the latter. The ends of the vertical track 80 can be locked in adjusted position with respect to the horizontal rails 84 by lock screws 86. The ends of the horizontal rails 84 of the second track are secured to the door 56. The track 80 and rails 84 lie in a plane perpendicular to the axis of rotation of the test wheel 70.

The door 56 has a window opening 88 in the front wall 46. A panel 90 is hinged to the top of the opening 88 and normally closes the opening in a substantially sealed relationship so that noises will not escape through the opening. The position of the carrier 78 along track 80 and of track 80 along rails 84 can be adjusted by reaching in through the opening 88 when the panel 90 is opened. The panel may be transparent so that an attendant may view the interior of the compartment during testing.

The cage 16 comprises the front rectangular frame 59 and a rear rectangular frame 94. The two housings 12 and 14 are placed side by side within the two frames supported on the bottom frame bars 96 of the front and rear frames by isolator pads 98 which may, for example, be of a suitable elastomeric material and are for the purpose of minimizing any vibratory noise which may be caused by shaking of the compartments during operation of the machine. The cage is supported on the floor 100 or any other suitable support surface by additional isolator pads 102 of the same construction and material and for the same purpose as the pads 98.

Figure 2:
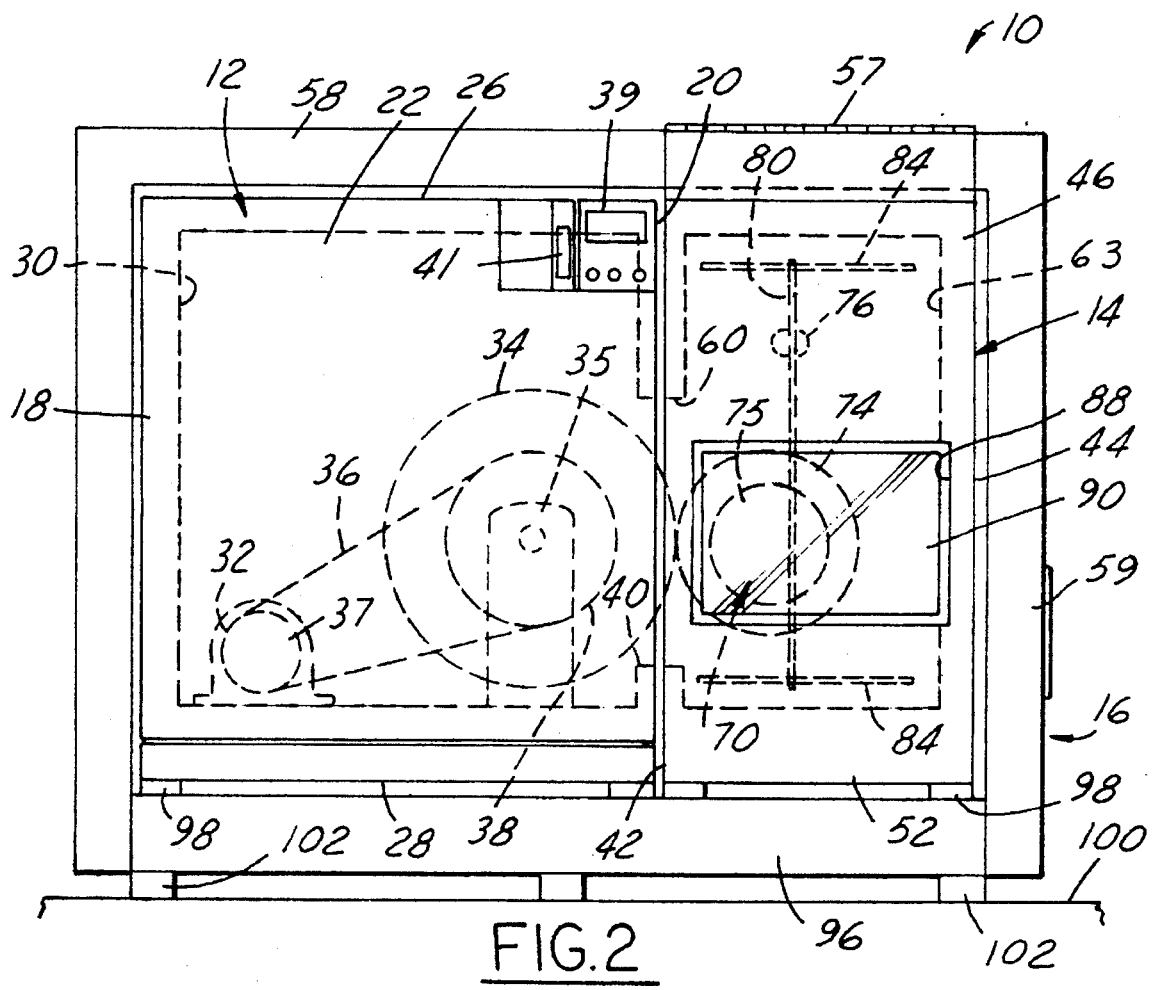
FIG. 2 is a front elevational view of a wheel cover noise testing machine constructed in accordance with this invention.
Figure 7:
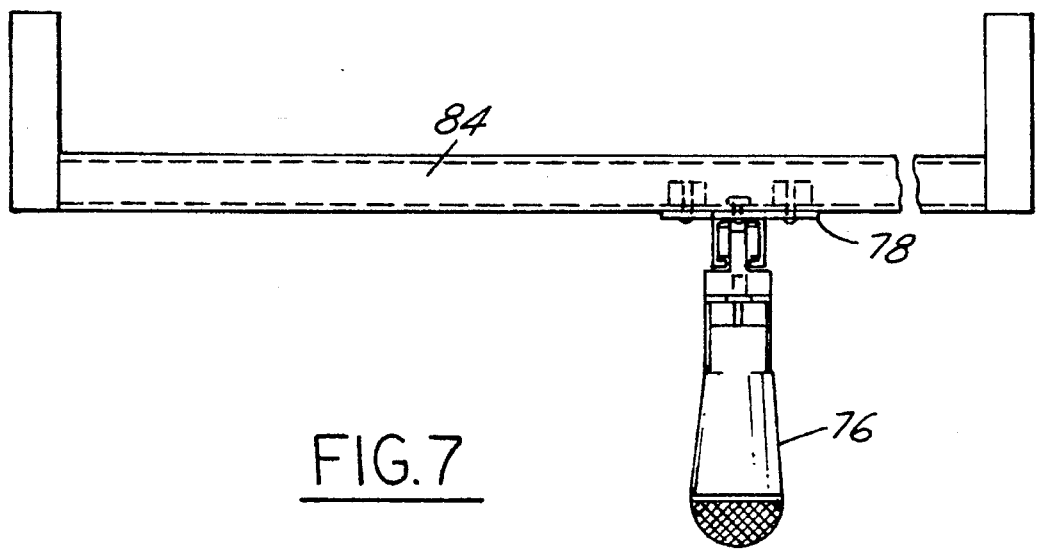
FIG. 7 is a top view of the structure in FIGS. 5 and 6.
Figure 5:
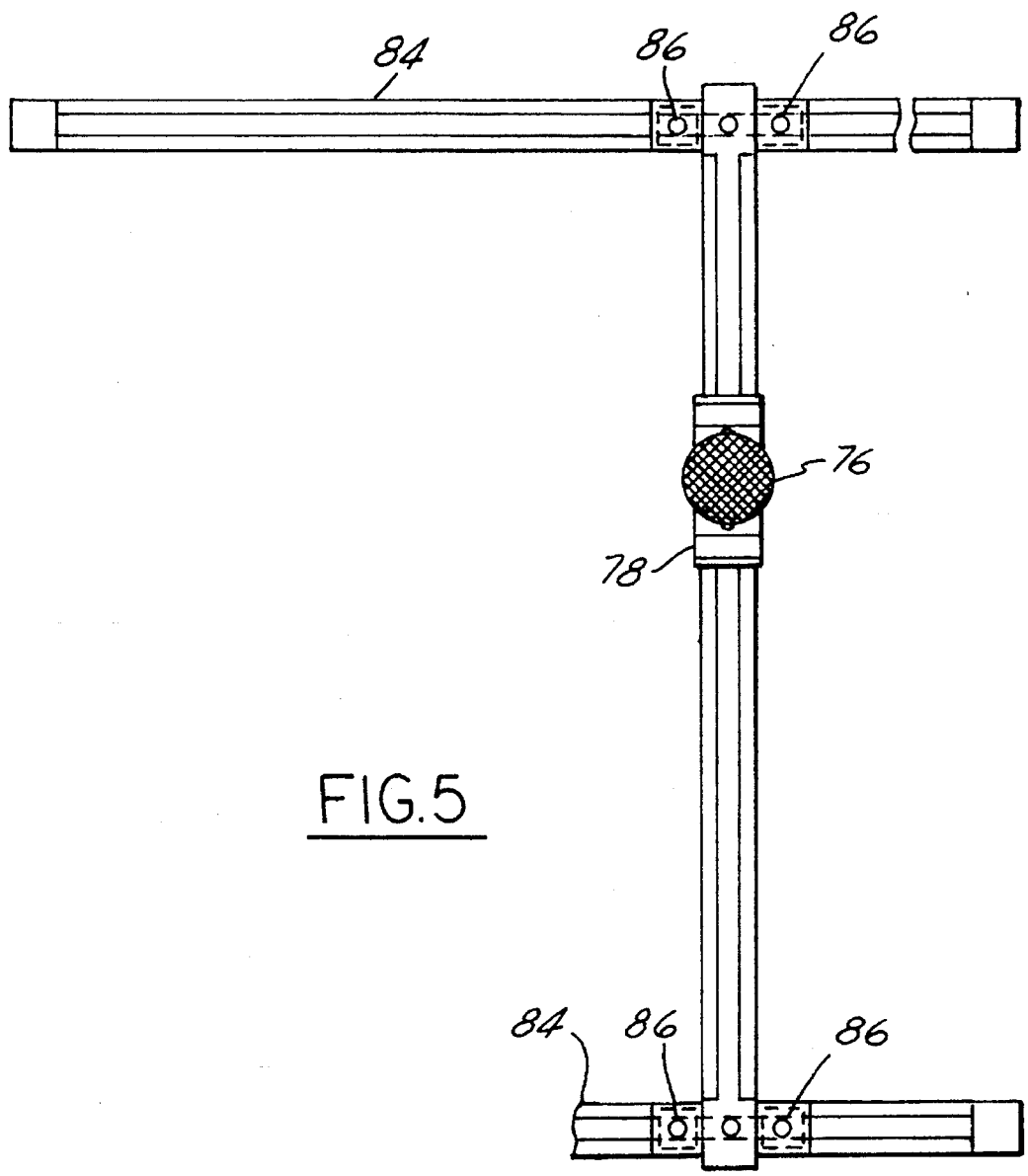
FIG. 5 is a fragmentary elevational view of a portion of the structure in FIG. 3, namely, a microphone and adjustable support structure therefor.

In operation, the door 56 is swung up to a horizontal position so that a test wheel with the tire 74 mounted on the rim 72 and a wheel cover 75 attached to the wheel body, may be mounted on the universal hub assembly 64. During this mounting operation, the universal hub position will be moved to the right of the position shown in FIG. 2. After the wheel is mounted on the universal hub assembly, the universal hub assembly is moved to the left in FIG. 2 and locked in this position to cause the periphery of the tire 74 to engage the periphery of the drive wheel 34 under sufficient pressure that the rotation of the drive wheel will be transferred to the test wheel without slipping. Then the door is closed. Any adjustment in the position of the microphone 76 may be made while the door 56 is open, or after the door is closed, microphone adjustment may be made by reaching through the window opening 88 when the panel 90 is swung to an open position. Then with the panel in closed position sealing the opening 88, the motor 32 is started to thereby rotate the drive wheel 34 and the test wheel 70, the tire of which is in frictional engagement with the drive wheel. Any and all wheel cover rattle or noise picked up by the microphone will be transmitted to a location away from the test machine for evaluation.

The compartment 63 is substantially closed except for the opening 60 through which the drive wheel 34 projects, so that extraneous noise is kept out. The motor 32 and most of the drive wheel 34 are in a separate compartment so that most if not all of the noise associated therewith is isolated from the compartment 63.

If it is desired during testing to move the position of the microphone, this may be accomplished by opening the panel 90 and reaching in through the open window. Of course, during testing, the entire procedure may be viewed through the panel 90 assuming of course that the panel 90 is transparent. At the end of testing, the motor 32 is turned off, the universal hub assembly 64 is repositioned to space the test wheel 70 from the drive wheel 34 and the test wheel may be removed through the open door 56.

Test wheels of varying sizes may be used for test purposes in this machine.

In analyzing the level of noise, it is thought that all that is needed is a direct measurement of the presence or absence of noise beyond or above a predetermined threshold. The noise threshold is a level of noise that is not discernable at normal hearing levels. If noise is heard, that is objectionable and adjustment or repair of the wheel cover or wheel cover mounting is necessary. The test may be run for 1 or 2 hours and audio taped, if desired.

What is claimed is:

1. A vehicle wheel cover noise testing machine comprising a housing providing a compartment, a test wheel in said compartment having a central axis and mounted for rotation about said central axis, said test wheel being adapted to have a wheel cover mounted thereon, means exteriorly of said compartment for rotating said test wheel, a microphone unit including a microphone for detecting and transmitting wheel cover noise incident to rotation of said wheel cover with said test wheel, and means for mounting said microphone unit in said compartment.

2. A machine as defined in claim 1, wherein said means for rotating said test wheel comprises a drive wheel, a second housing providing a second compartment and positioned adjacent to but spaced from the first-mentioned housing, said housings having adjacent walls provided with registering openings, said drive wheel being mounted in said second compartment for rotation, and means for rotating said drive wheel, said drive wheel and test wheel being in peripheral contact through said openings so that said test wheel is rotated by said drive wheel.

3. A vehicle wheel cover noise testing machine comprising a first housing providing a first compartment, a second housing providing a second compartment and positioned adjacent to but spaced from said first housing, a test wheel in said first compartment having a rim and a first central axis and mounted for rotation about said first central axis, a tire mounted on said rim, said test wheel being adapted to have a wheel cover mounted thereon, a drive wheel in said second compartment having a second central axis and mounted for rotation about said second central axis, a motor in said second compartment for rotating said drive wheel, said first and second housings having adjacent walls provided with registering openings, said drive wheel and the tire of said test wheel being in frictional peripheral contact through said openings so that said test wheel may be rotated by said drive wheel, a microphone unit including a microphone for detecting and transmitting wheel cover noise incident to rotation thereof with said test wheel, and a microphone support in said first compartment for supporting said microphone unit in adjusted position.

4. A machine as defined in claim 3, wherein said microphone support comprises a first elongated track extending in a first direction, a second elongated track perpendicular to said first track and mounted on said first track for movement along the length of said first track, said first and second tracks disposed in a plane perpendicular to said first central axis of said test wheel, said microphone unit being movable along the length of said second track, and releasable means for locking said microphone unit to said second track in adjusted position and said second track to said first track in adjusted position.

5. A machine as defined in claim 3, wherein said first housing has a window opening into said first compartment enabling access to and adjustment of the microphone unit, and a panel movable between open and closed positions with respect to said window opening.

6. A machine as defined in claim 5, wherein said panel is transparent to enable viewing the interior of said first compartment.

7. A machine as defined in claim 3, wherein the periphery of said tire is formed with continuous, laterally spaced apart, circumferential tread grooves.

8. A machine as defined in claim 3, wherein said first housing has a door movable from a closed position with respect to said first compartment to an open position enabling loading and unloading a test wheel, tire and wheel cover into and out of said first compartment.

9. A machine as defined in claim 8 wherein said door has a window opening into said first compartment enabling access to and adjustment of the microphone unit, and a panel movable between open and closed positions with respect to said window opening.

10. A machine as defined in claim 9, wherein said panel is transparent to enable viewing the interior of said first compartment.

11. A machine as defined in claim 10, wherein said microphone support comprises a first elongated track extending in a first direction, a second elongated track perpendicular to said first track and mounted on said first track for movement along the length of said first track, said first and second tracks disposed in a plane perpendicular to said first central axis of said test wheel, said microphone unit being movable along the length of said second track, and releasable means for locking said microphone unit to said second track in adjusted position and said second track to said first track in adjusted position.

12. A machine as defined in claim 11, and further including a safety cage surrounding said housings, said cage having a support surface, and noise isolator pads supporting said housings on said support surface.

13. A machine as defined in claim 12, and further including a hub assembly on which said test wheel is removably mounted, and means mounting said hub assembly for movement toward said drive wheel to contact the tire of said test wheel with said drive wheel and away from said drive wheel to enable loading and unloading the test wheel on and off of said hub assembly.

14. A machine as defined in claim 13, wherein the periphery of said tire is formed with continuous, laterally spaced apart, circumferential tread grooves.

* * * * *